United States Patent [19]

Kirknes

[11] Patent Number: 5,144,313
[45] Date of Patent: Sep. 1, 1992

[54] METHOD FOR PROCESSING TRANSMITTED AND REFLECTED SIGNALS FOR REMOVING UNWANTED SIGNALS AND NOISE FROM WANTED SIGNALS

[76] Inventor: Steffen Kirknes, Innbygda, N-7580 Selbu, Norway

[21] Appl. No.: 690,498

[22] Filed: Apr. 24, 1991

[51] Int. Cl.$^5$ .............................................. G01S 13/82
[52] U.S. Cl. ........................................ 342/44; 342/42
[58] Field of Search ................................... 342/44, 42

[56] References Cited

U.S. PATENT DOCUMENTS

| | | | |
|---|---|---|---|
| 3,691,557 | 9/1972 | Constant | 342/44 |
| 4,015,259 | 3/1977 | Siverhus et al. | 342/44 |
| 4,725,841 | 2/1988 | Nysen et al. | 342/44 |

Primary Examiner—Mark Hellner
Attorney, Agent, or Firm—James E. Pittenger

[57] ABSTRACT

In an identification system based on reflection of radar signals from a bit-coded transponder, the received signals are processed to remove unwanted signals and noise from the required, reflected and received signals that have a recurrent cycle. The reflected signals are extremely weak in relation to the unwanted signals and noise. A random bit sequencer and a time slot generator are used to generate a single phase modulated pulse train which is transmitted by an RF transmitter. The pulse train signal is received and reflected from a coded passive transponder back to a comparable receiver. The receiver demodulates the incoming reflected signal and directs the demodulated signal to an integrator array. An inverted signal from the receiver is also utilized. Synchronization of the transmitted and received signals is performed through a shift register while the bit sequencer controls a second integrator array. In this way, the unwanted signals and noise associated with the low power reflected signal is substantially eliminated.

14 Claims, 4 Drawing Sheets

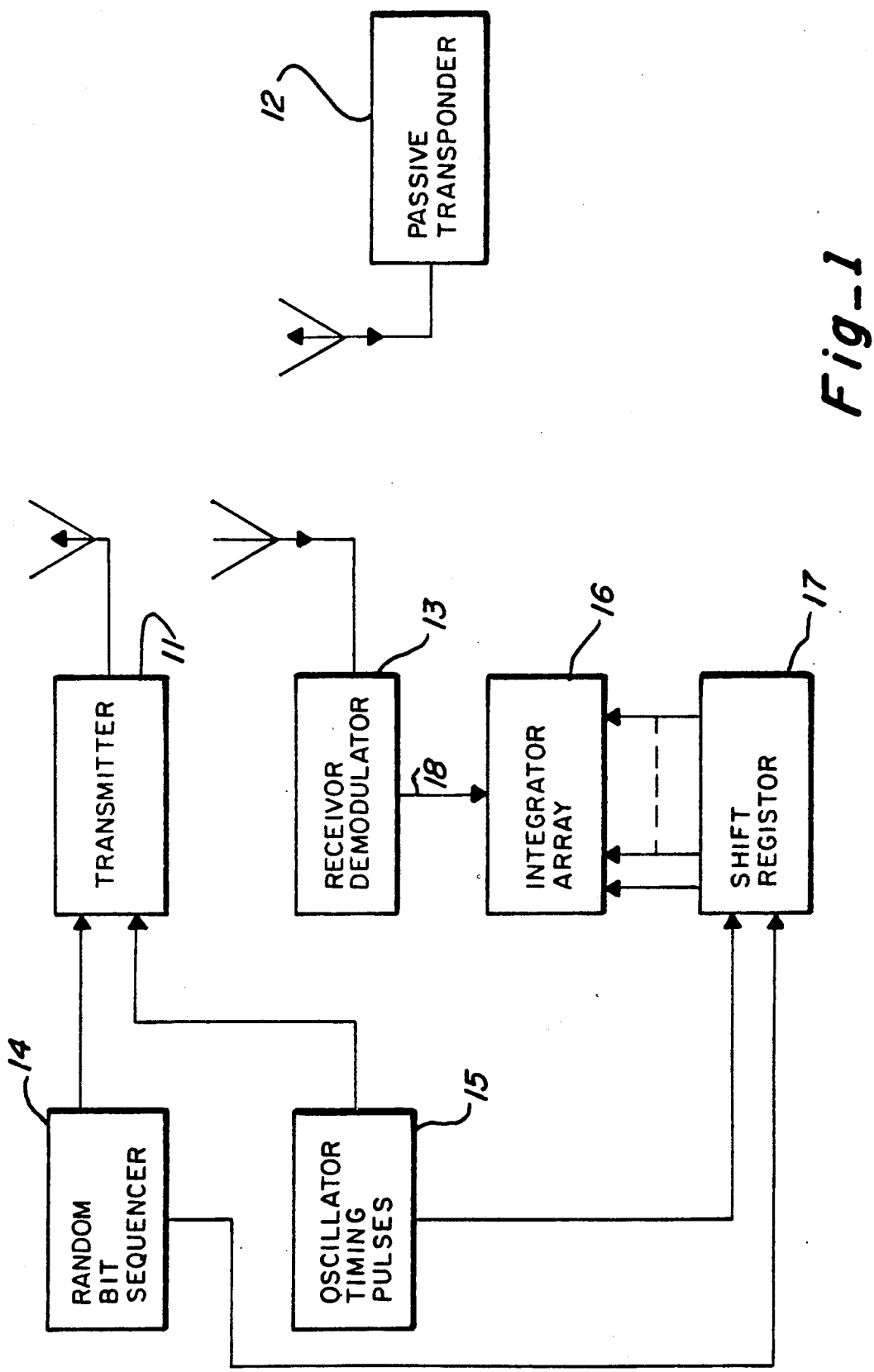

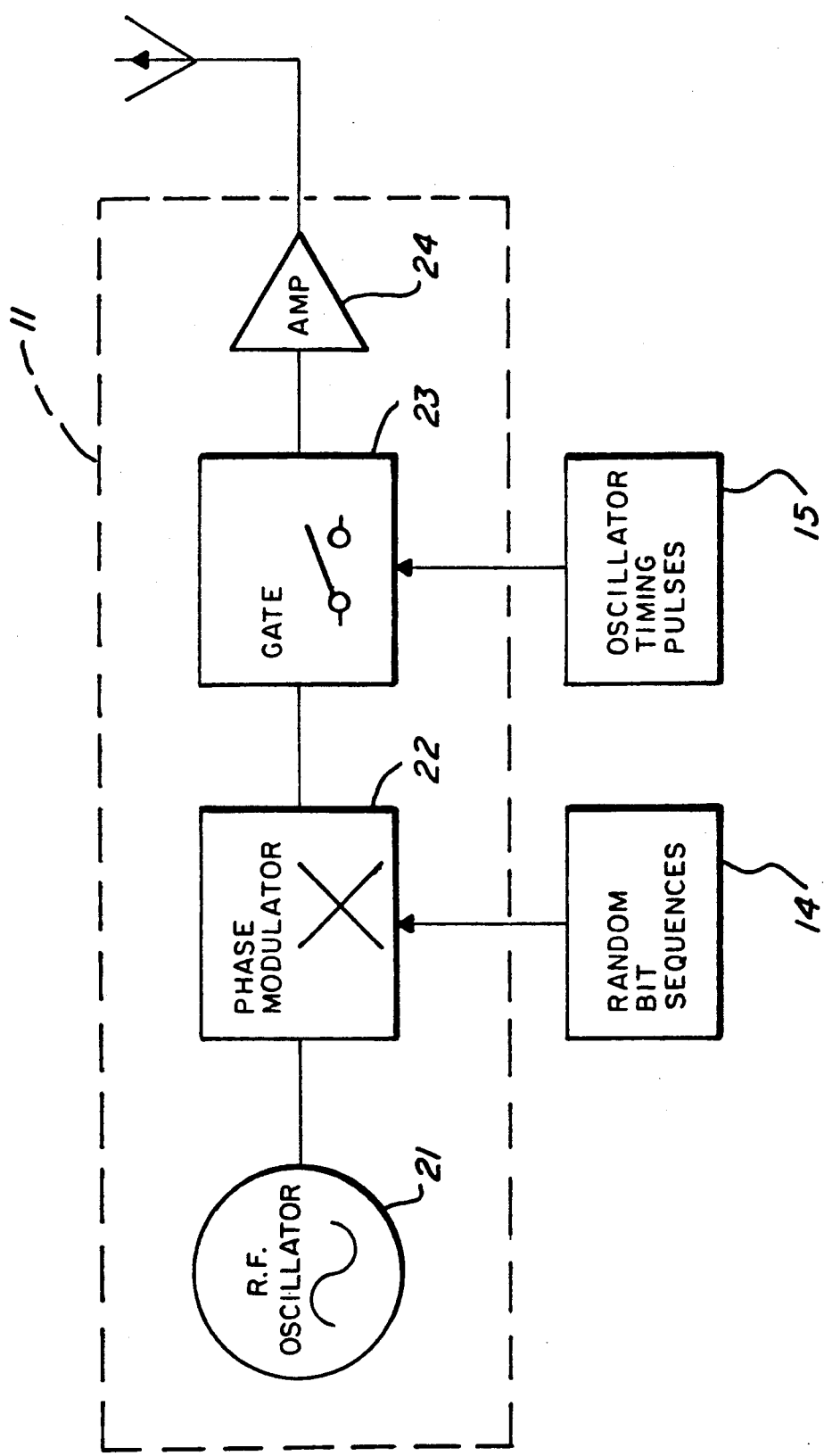
Fig_2

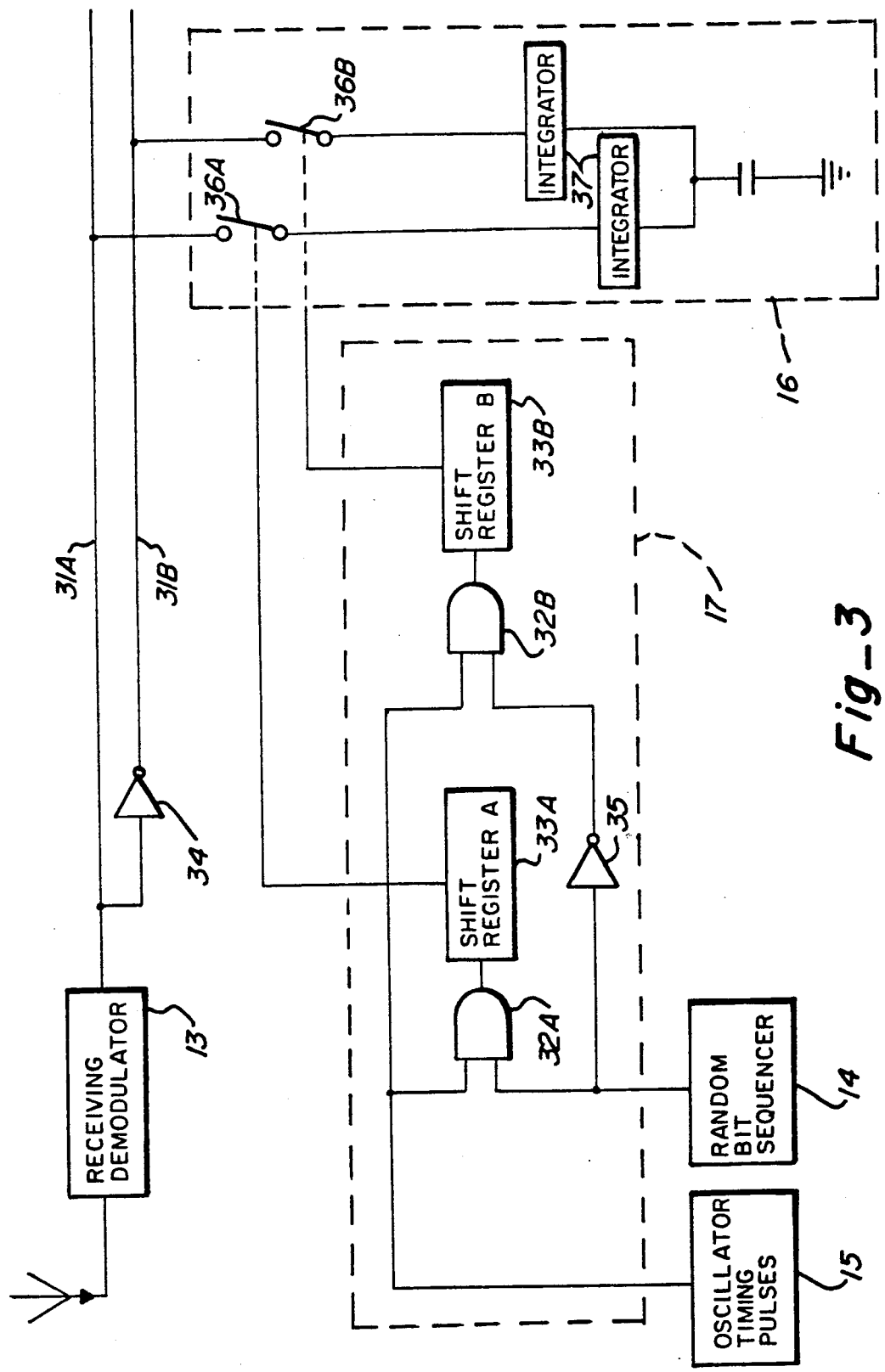
Fig_3

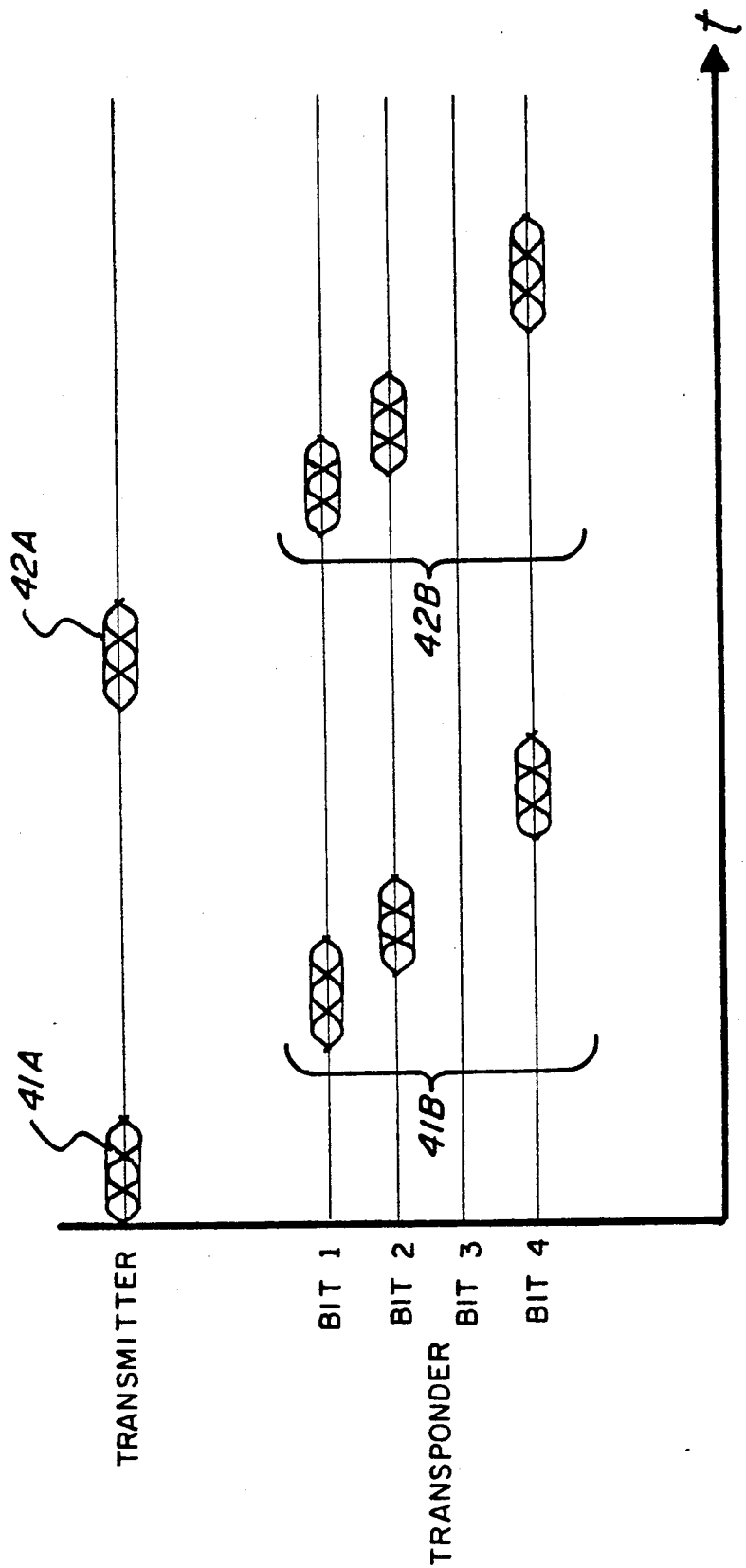
Fig_4

5,144,313

METHOD FOR PROCESSING TRANSMITTED AND REFLECTED SIGNALS FOR REMOVING UNWANTED SIGNALS AND NOISE FROM WANTED SIGNALS

FIELD OF THE INVENTION

The invention concerns a method for processing signals in an identification system.

BACKGROUND OF THE INVENTION

The invention is designed for application in an identification system that consists of a transmitter, a mobile bit-coded passive transponder that produces identification, and a receiver unit that in combination make up a processing system.

The transponder can be realized by means of SAW technology (Surface Acoustic Wave). This is a technology with many advantages for such an application, it is inexpensive, straightforward to produce, requires no maintenance, and is independent of external power sources etc. However a transponder realized in accordance with this technology has a characteristic which initially has one drawback: the high insertion loss. This means that the reflected return signal is weak in relation to the incoming interrogator pulse. The disadvantage is intensified as the transmitter unit utilizes a low output radar to meet the beam output requirements in the frequency used.

The combined result is that the output of the required return signal to the system's receiver unit is very low in relation to the unwanted signals, noise and the inherent noise in the receiver itself.

The traditional method for processing signals to improve the signal/noise ratio for the applications mentioned is to digitalize the reflected signal directly with an A/D converter and follow this by digital processing. The processing is done by averaging the digital values of the analog signals for several repeated return signal cycles. This will improve the signal/noise ratio because the required signal is identical for each cycle whilst the noise is different. On the other hand, this method necessitates a powerful digital processing unit. The unit has to be fast and have substantial calculating power to average an adequate number of cycles. At the same time, the A/D converter must be one of the fastest and most advanced types available. This solution means that the technology used clearly limits how efficient the processing is. This will also necessitate the use of expensive digital processors and A/D converters.

Another traditional method which is used in radar technology is using delay lines so that a signal is delayed one cycle and averaged by adding these signals analogously. This method has one limitation that the number of averages that can be made is very restricted and there is no synchronization with the cycle.

U.S. Pat. No. 3,706,094 describes a receiver for a low output radar surveillance system, where the receiver consists of equipment for analog processing of received, recurrent pulse signals whereby each pulse signal is divided up into a certain number of time slots in gate control circuits. Further, the signal from each gate circuit is led to an integrator for the recurrent integration of the pulse signals as the repetition frequency of the pulse signals is considerably higher than the integrator's low-pass filter frequency. The pulse signal can be reconstructed from the responder by reading the output from the integrator.

SUMMARY OF THE INVENTION

The main objective of the present invention is to create a safe means of recognizing a radar signal which is reflected from a passive, coded transponder by the phase modulation of the transmitted signal.

This can be done by implementing the method stated in Claim of 1. Other aspects of the invention are stated in the remaining claims of patent.

The present invention can be distinguished from the technique adopted in the patent specification referred to by the fact that the present invention utilizes interaction between the transmitted and reflected signals. This is done by a random binary digital sequence which modulates the transmitted signal, and employing the same bit sequence when the demodulated reflected signal is to be recognized. This generates a large number of phase-modulated pulse trains, which are preferably different. This is achieved by dividing the above-mentioned random bit sequence and using these divisions of the random bit sequence to lead the demodulated reflected signal into a storage medium such as an integrator link that is designed so that the medium will contain values from the means of the required signals, whilst the unwanted signals and noise are greatly reduced.

The technique used in the invention consists of an analog averaging of the signal before it is digitalized.

This has several advantages over traditional techniques. A huge processing capacity can be achieved using only completely conventional, commercially accessible, inexpensive components. This results in a speed and averaging capability for recurrent cycles that is far in excess of any of the above-mentioned traditional approaches. At the same time, the lower reading rate will mean that type of A/D converter and later the digital processing unit can be used so that this will be commercially attractive.

As a bit sequence is used both for the transmission to modulate the transmitted signal and for the receiver to control the storage and average the demodulated, reflected signal, all types of noise and unwanted signals are reduced significantly compared to the required signal. Since the above bit sequence is part of a random bit sequence, noise and unwanted signals will be greatly reduced even if they are part of an unfavorable recurrent cycle.

It is also possible to achieve better transmission by using phase-modulated and preferable different pulse trains instead of a single pulse, where the increased length of a pulse train is limited ahead by the time of the first reflected pulse train.

BRIEF DESCRIPTION OF THE DRAWINGS

An example of the design of the invention will be given with reference to the illustrations.

FIG. 1 is a block diagram of one means of designing the invention which includes the main components;

FIG. 2 shows a more detailed presentation of the transmitter unit in this particular design;

FIG. 3 shows a more detailed presentation of the receiver- and decoder unit in this particular design;

FIG. 4 shows a chronological presentation of the transmitted and reflected signals in this design of the invention.

DETAILED DESCRIPTION OF THE INVENTION

The design in FIG. 1 consists of a transmitter unit 11, an identification chip 12 which could for example be a passive SAW transponder, and a receiver unit 13 which is connected to an array 16 of integrator sections. A device 14 creates a random bit sequence which is fed to the transmitter unit 11 and a shift register 17 connected to the integrator array 16. A device 15 forms a signal with time boundaries which is fed to the transmitter unit 11 and the shift register 17.

The design functions as follows: The transmitter unit 11 transmits a phase-modulated pulse train which is received and reflected by the coded transponder 12, so that the reflected signal consists of a series of pulse trains and spaces where there are no pulse train, which together form an identity that equates the transponder code, which also consists of phase-modulated pulse trains. The required signal is picked up by the receiver 13 which then demodulates it and sends it to an integrator array 16, this is controlled by the above-mentioned bit sequence from device 14 together with the time slot from device 15.

FIG. 2 gives a more detailed presentation of the transmitter unit. This consists of an oscillator 21 which forms a fixed frequency signal. This signal is phase-modulated by a random bit sequence from device 14. Once modulated, the signal is divided up into pulse trains by means of a gate device 23, controlled by the time slots from device 15. The pulse trains are then amplified by an amplifier 24 prior to transmission.

FIG. 3 shows a more detailed presentation of the receiver- and decoder unit. The signal is demodulated in a receiver 13 into a time- and phase-coded signal 31a, superimposed upon unwanted noise. In this example of the invention the signal 31a enters a switch 36a which leads the signal 31a into an integrator section 37. This integrator section 37 can, for example, be an RC filter with a high time constant compared to the individual signal cycles (e.g., 10,000 times greater).

The bit sequence from device 14 and the time slot signal from device 15 form the input to an AND-gate 32a, where the output goes to a shift register 33a, which then receives exactly the same bit sequence as that used in the transmitter to form the phase-modulated pulse train. This bit sequence is then clocked along the shift register 33a by means of an external clock signal (not illustrated on the figure). It is possible to obtain a signal from different positions on the shift register 33a, i.e., after certain intervals of time after the signal has been fed into the shift register 33a. When the time interval which equates the time delay for the first bit on the transponder 12 has elapsed, the signal is removed from the shift register and used to control the switch 36a that opens or closes for the demodulated signal 31a from the receiver 13 and in to the integrator section 37.

The signal 31a can be inverted by means of an inverter 34 to a signal 31b, which is also fed into the integrator section 37. This is done by feeding the random bit sequence 14 through an inverter 35 to another shift register 33b and removing it at an equivalent position to the first shift register 33a and controlling the switch 36b so that it opens or closes for the inverted signal 31b into the integrator section 37. Both switches 36a and 36b can be controlled for instance so that a logical "1" in bit sequence 14 opens the switch for the non-inverted signal 31a from the receiver and the switch for the inverted signal 31b closes; if a logical "0" occurs in the bit sequence 14, the opposite will occur.

In the time interval where pulse trains are not formed from the transmitter 13 because the signal from device 15 has a logical value of "0", the AND-gates 32a and 32b will always have a logical "0" in their output, this ensures that both switches 36a and 36b will be open to hinder unwanted noise from entering the integrator section.

The integrator array 16 is formed from a number of integrator sections 37, which typically equate the number of bits or the multiple of the number of bits in the reflector device 12. The individual integrator sections 37 can be read whenever the required number of pulse trains have been processed. This reading can be done asynchronically without any attention having to be paid to anything that has happened previously.

FIG. 4 shows a chronological presentation of how two pulse trains are transmitted from the transmitter 11 and are reflected from the transponder 12, in an example where the transponder 12 has a resolution of four bits. Here the transponder 12 is coded with the bit sequence 1101.

The first pulse train 41a is a phase modulated signal which is modulated by the first part of a random bit sequence from device 14, with a length determined by the time slot formed by device 15. The first pulse train 41a is received by the transponder 12 and reflected where it is coded to logical "1". As the transponder in this example has the code 1101, the reflected signal will form a pattern as shown in 41b where bit 1, bit 2 and bit 4 reflect a pulse train, whilst bit 3, which has the logical value of "0", will not reflect any signal. The reflecting pulse trains 41b can and will overlap each other in the various bit positions without this having any negative consequences on the result.

Once the last reflected pulse train is received, the second pulse train will be transmitted. This pulse train is phasemodulated by another part of a random bit series, different from that in the first pulse train, from device 14 activated for a certain length of time decided by the time slot in device 15. This second pulse train 42a is then reflected from the transponder 12 as in the first case, thus forming a row of reflected pulse trains 42b.

A large number of pulse trains, equivalent to pulse trains 41a and 42a, all phase modulated in different ways, can be transmitted, reflected, and led into the integrator array 16 so that the required signal is averaged and unwanted signals that are random and asychronous will be greatly reduced.

I claim:

1. A method in an identification system, wherein a radar signal is transmitted from a transmitter, said signal is arranged to be received by a mobile, bit-coded identification transponder which returns a coded signal that is received by a receiver; the received coded signals are processed in order to remove unwanted signals and noise from the reflected, coded and wanted signals, wherein a pseudo-random bit sequence is used, characterized by comprising the steps of:

phase modulating the radar signal with a pseudo-random bit sequence, dividing the modulated radar signal in time slots, forming a pulse train, which is transmitted, passively reflecting from the transponder the transmitted pulse train signal, said transponder being encoded with binary coded information, and the reflected pulse train is modulated with the binary code of the transponder, said receiver receiving and demodulating the reflected, coded pulse train signal using the same pseudo-random bit sequence and same time slots as were used at transmission, both of which being time delayed in order to demodulate the reflected pulse train signal to store, average and process the identification code from the bit-coded transponder for individual recognition.

2. A method in accordance with claim 1, characterized by said random bit sequence that is formed is different for each recurrent cycle.

3. A method in accordance with claim 1, characterized by the said binary-coded device reflecting the said pulse train signal at different times by means of the various bit positions in the device.

4. A method in accordance with claim 1, characterized by the demodulated signal being fed into a storage medium where the discrete values in the random bit sequence are able to control a device that opens for signals with a given bit value, and closes for signals that have the inverse value.

5. A method in accordance with claim 1, characterized by the random bit sequence being fed through a device that delays the values in time so that they are synchronized with the reflected signal.

6. A method in accordance with claim 5 characterized by the random bit sequence passing through a logical AND-gate operation prior to the delay device so that the storage device is blocked for signals outside the periods that equate the reflected pulse train.

7. A method in accordance with claim 1, characterized by the inverse demodulated signal being fed into the said storage medium, controlled by the inverse values of the said random bit sequence.

8. A method in accordance with claim 1, characterized by the said storage medium including the capability of storing a number of values which correspond to the number of bits in the reflecting device.

9. A method in accordance with claim 1, characterized by the said control signal being able to be extracted and used at different points in time, corresponding to the positions of the different bits in the reflecting device.

10. A method in accordance with claim 1, characterized by the said storage medium being designed so that a recurrent cycle of the received, demodulated and stored signal cycles are averaged over time.

11. A device for filtering high frequency radar signals comprising;
    a transmitter unit comprising an oscillator means and a generator means for generating a pseudo-random bit sequence, said transmitter unit being arranged to transmit a signal;
    a remote binary coded transponder capable of reflecting at least a part of the transmitted signal;
    a receiver unit arranged to receive and demodulate the transponder reflected signal; and
    a controllable storage unit attached to said receiver unit;
    characterized by the generator means of the transmitter unit being arranged to phase modulate the signal from the oscillator means, and the transmitting unit further comprises a time interval generator means, arranged to divide the phase modulated signal into a pulse train for transmission,
    the transponder is individually binary coded to reflect a pulse train modulated with this code, and
    the random bit sequence generator means and the time interval generator means are connected to at least one AND- gate having an output to at least one shift register, which is arranged to control the transmitter connected controllable storage medium.

12. A device according to claim 11, characterized by an invertor means is connected to the reflected, demodulated signal, and a second invertor means is connected to the random bit generator means for controlling the passage of the demodulated inverted signal to the storage medium.

13. A method in accordance with claim 1, characterized by the said storage medium including the capability of storing a number of values which correspond to the multiple of the number of bits in the reflecting device.

14. A method in accordance with claim 1, characterized by the said control signal being able to be extracted and used at different points in time which correspond to the multiple of the time delays between the bits in the reflecting device.

* * * * *

UNITED STATES PATENT AND TRADEMARK OFFICE
CERTIFICATE OF CORRECTION

PATENT NO. : 5,144,313
DATED : September 1, 1992
INVENTOR(S) : Steffen Kirknes

It is certified that error appears in the above-identified patent and that said Letters Patent is hereby corrected as shown below:

ON THE Title PAGE: Items

| [22] | PCT Filed: | April 24, 1989 |
| [86] | PCT No.: | PCT/NO89/00034 |
|      | § 371 Date: | April 24, 1991 |
|      | § 102(e) Date: | April 24, 1991 |
| [87] | PCT Pub. No.: | WO 90/04794 |
|      | PCT PUB. DATE: | May 3, 1990 |

[30]     Foreign Application Priority Data
October 27, 1988  [NO]  Norway ....... 884784

Signed and Sealed this

Nineteenth Day of October, 1993

Attest:

BRUCE LEHMAN

Attesting Officer     Commissioner of Patents and Trademarks